UNITED STATES PATENT OFFICE.

CARL KINSLEY, OF CHICAGO, ILLINOIS, ASSIGNOR TO GLOBE PRINTING TELEGRAPH COMPANY, A CORPORATION OF MICHIGAN.

TELEGRAPHIC SYSTEM AND APPARATUS.

1,018,115. Specification of Letters Patent. Patented Feb. 20, 1912.

Application filed February 2, 1903, Serial No. 141,524. Renewed February 1, 1908. Serial No. 413,841.

*To all whom it may concern:*

Be it known that I, CARL KINSLEY, citizen of the United States, residing at Chicago, in the county of Cook and State of Illinois, have invented certain new and useful Improvements in Telegraphic Systems and Apparatus; and I do hereby declare the following to be a full, clear, and exact description of the invention, such as will enable others skilled in the art to which it appertains to make and use the same.

My invention relates to systems of telegraphic communication, particularly to those systems wherein automatic transmitters and receivers are employed.

It has for its object the production of a system of this class that shall be more rapid and more accurate than the systems heretofore in use.

In high speed telegraphic transmission as heretofore practiced many difficulties have been discovered and overcome in both transmitting and receiving apparatus, but the principal troubles still remain—those due to the inherent limitations of the receivers. Under present conditions it is quite possible to construct a transmitter which will send many more characters than any receiving apparatus in use can record, in a given time. Most of these transmitters employ a perforated tape or its equivalent, and as the contact brushes resting on the tape are short and readily adjusted to any tension desired, practically the only limiting factors are the line constants and those of the receiver.

As will appear later, I do not make any radical changes in the transmitting mechanism, my invention being directed particularly to the receiver. Two types of receivers have been most generally used. These are the mechanical printer and the chemical recorder. Each has its own distinctive limitations, which I will point out. It has been said by competent authority that no system of this kind wherein mass has to be moved in response to the line impulses, will ever bring down the cost of telegraph transmission to a point where it will rob the mails. In general this is true. It is quite true of the mechanical printers now in commercial or semi-commercial use. In several of these alphabetical type levers have to be swung, or levers shifted, through a considerable path, to print. Moreover such type bars or levers are usually controlled by printing magnets which are themselves controlled by line relays. This means that the inertia of all the moving parts of the printer is augmented by the inertia of the relay armatures, as well as by the magnetic reluctance in both printing magnets and relays, the aggregate time loss being of necessity fatal to the receipt of messages at a higher rate than perhaps one hundred words per minute, and perhaps not that. The employment of relays in such cases is almost imperative, in spite of the time loss they entail, because the changes in current on a line of any length are not sharp enough except at very moderate speeds to make clearly differentiated signals, and moreover, in order to cut down the number of impulses to a practicable point polarity is resorted to, and the relays made selective. The other class of receivers, that is the chemical recorders, have faults and limitations almost as serious as the printers. The recording is usually done on a tape, which can be driven under contact pens as rapidly as the transmitting tape, or nearly so. In so driving it the contact pens usually rest on its surface, and as current passes through them marks are made by chemical decomposition and recomposition. Over short lines, with strong currents, fairly good results can be obtained in this way, but as soon as longer lines are tried (where in practice the greatest need for such systems exists) trouble begins. The variations in current at the receiving end, passing at a frequency of 25,000 or more impulses per minute, are almost smoothed out, so that the action on the tape is slight. As decomposition takes place in the sensitizing medium, moreover, part of the products of such decomposition adhere to the pen points, and cause a continuous chemical effect on the tape under the pens, making lines or "tailings" that are quite plain. Now, when the weak increases or changes in the line current come in, and recording action takes place, the added decomposition is hardly to be noticed, and in fact at very high speeds the record is hardly legible, the tape soon after starting showing continuous white or light lines, with scarcely a variation. At lower speeds, even, this fault makes the record untrustworthy. Every effort has been made by those interested in chemical telegraphs to eliminate the feature of continuous action, with resulting "tailings", but so far, without practical success.

The ideal commercial system, is that wherein the message is directly printed in legible characters, and in such shape and on such material that it can be delivered to the person for whom it is intended, without copying or other handling. My invention is intended to accomplish this, which heretofore has been possible only to the class of so called printing telegraphs, the chemical recorders employing a code.

In developing my purpose, and in seeking to improve existing apparatus, I have found that neither of the old classes is susceptible of great improvement in itself; but I have found it possible to combine the methods of both, in such a manner as to substantially eliminate their faults and enhance their virtues. It may be true that no system wherein masses have to be moved bodily will ever attain theoretical freedom from speed limitation, or even attain the ultimate speed at which recording tape can be driven, but as this speed is very high its attainment is not necessary. In any equation for the speed of receiving, the line constants and the instrument constants are the factors principally affecting the result, and, disregarding the line constants, by reducing the inertia in the instruments we can gradually raise the resultant speed until the theoretical limit is approached; but although this has always been apparent, it has not heretofore been possible, for mechanical reasons, to reduce the inertia, which means the number, or the mass, or both, of the receiver parts, beyond a certain point. I have found it possible to continue the reduction beyond any limits heretofore reached. To do this I have discarded mechanical printing mechanism, whether of the impact type or others, and while I directly record legible characters, I substitute electrical action for the printing, thus borrowing one feature from the chemical recorders. As the impression does not depend on the possession of mass, or the momentum of the printing member, I am enabled to employ greatly attenuated masses, approaching the theoretical limit to which I have referred. Although the electrical printing necessitates contacts and a traveling surface, obviously there will be no "tailings," because there is not constant contact.

My invention consists essentially in the provision of a moving chemically sensitized surface over which certain character printing contacts are normally held up by magnets, which may be either permanent or electromagnets.

The contacts and the surface (through its platen) are in a local circuit closed except at their adjacent points. The magnets are connected to line so that proper impulses thereover will effect the release and the reattraction of the contacts, causing them to touch and to leave the surface as desired. In some cases the local circuit can be dispensed with, and the contacts and platen included in a branch of the line to derive current therefrom. I have found the local circuit satisfactory, however, as the record is uniform and strong. The contacts are usually pens of resilient material attached to the poles of permanent magnets so as to be normally held up in distorted position. Coils on the magnet poles permit the line impulses to vary or reverse the magnetization at will, and the use of polar magnets permits also a selective arrangement whereby a greater number of magnets can be controlled over one or two conductors than would otherwise be possible. As the pens are normally held up, the attractive force of the magnets can be nearly balanced against their resilience, so that a very slight change in the magnetization, due to a correspondingly slight change in line current, will release the pens, which snap down to the surface by their own resilient action, and snap back to the magnet by the reaction as well as by the attractive force restored upon cessation of the line current.

The pens are small and light, and as they are acted on directly by the magnets, there are no intermediate losses. The action is absolutely certain, because the instant a pen starts away from the magnet pole we have a cumulative force acting against a diminishing resistance, with acceleration such that its stroke will surely be made; and to fully insure this I may proportion the parts so that the natural period of the pens in vibration would be approximately the same as the normal frequency of transmission. I have not found this necessary, however, as the results are excellent without it. The frequency of the current impulses is always lower than the period of the pens. By the current impulses are meant those impulses which operate any single element so that in every individual letter or in a succession of letters that may be formed in any sentence, the pen of any element will have returned to its resting place, under control of the receiving magnet, before the following current impulse arrives which is designed to again operate the element.

The natural period of the pen under operative conditions may be altered at will by changing its length, mass or stiffness, so that it is always possible to have the pen return to its place of rest quickly enough so that it is ready for response to the next succeeding current impulse intended to release it. The reduction of the mass of the element is limited only by the desirability of making a definite contact with the surface of the paper, and this limit depends somewhat upon the character, as to roughness, of the paper surface, while at the same time the desired natural period of the pen can be maintained by giving it an appropriate length, mass and stiffness.

The high frequency possible of attainment by my method enables me to form an alphabet with a smaller number of component parts or characters in the marking set, that is to say a smaller number of pens, than has ever been practicable before to my knowledge. It will be found upon reading the detailed description hereinafter, that the same character or element in my case can be employed to make two successive marks in the same letter, which is a very important characteristic feature of the invention, and one which will be claimed as novel and original with myself.

By giving the pens such proportions as to make their natural period very high, and by making them exceedingly light, that is by attenuating their masses, I increase the range of responsiveness widely. Obviously, it is quite possible to make heavier pens, or levers, short enough to have a high period, but such devices would be limited to approximately the one frequency of transmitted impulses, by reason of their mass, and while in some cases this might be desirable, as where resonant selectivity is desired, in the present case it would be rather the reverse, as I desire my receiver to operate without fine adjustments or regulation, which are easily attainable in the laboratory but difficult to maintain in practice.

Roughly, my arrangement may be defined as a chemical receiver with magnetic control, in which the fault of "tailings" is absent, and the only practical limitation to speed is the line factor.

The invention also includes arrangement of transmitting circuits as hereafter described, the use of transformers for purposes that will be set forth, the use of elements, which may be recorded separately or together, to print characters, the arrangement of printing magnets, and various duplex and other arrangements to which the receiver is particularly adapted. All of these features of invention will be duly set forth in the specification and claims hereto annexed.

Referring to the accompanying drawings, wherein the same letters of reference point out the same parts throughout.

As before stated, my invention resides principally in the receiving mechanism and the arrangement of the circuits. I employ a known type of transmitting mechanism, in which I have made some improvements, however.

Figures 1, 2, 3, 4, 12:
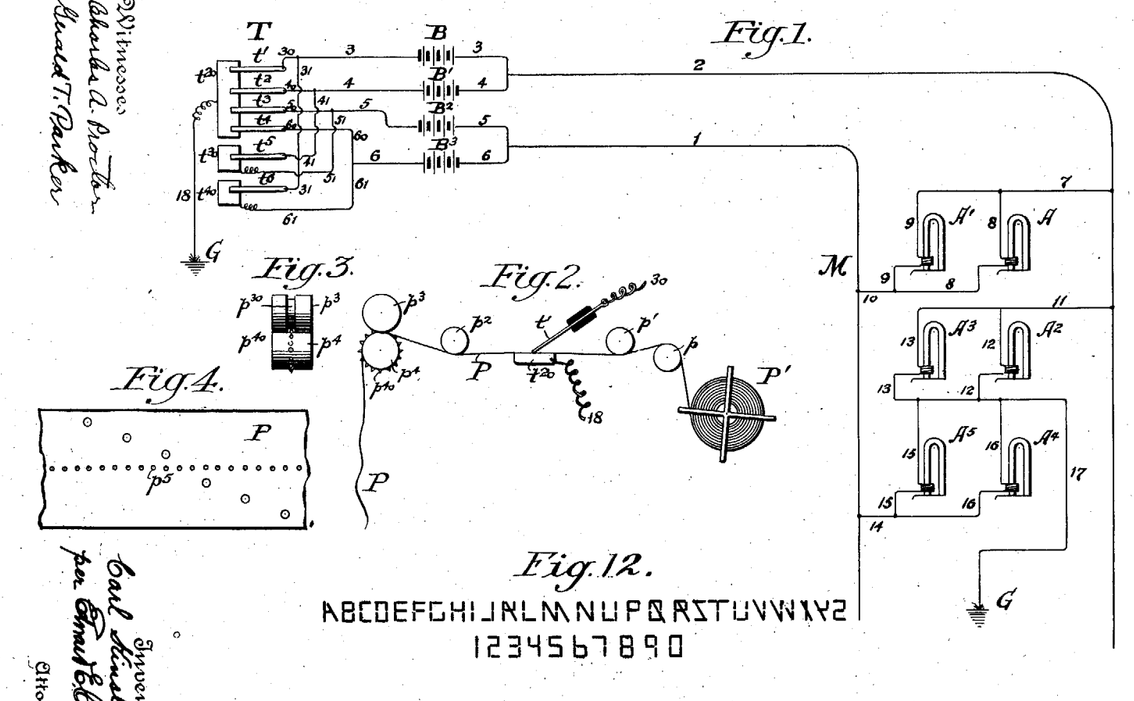
Figure 1 is a diagram of a complete system embodying my invention.
Fig. 2 is a detail view of parts of the transmitter.
Fig. 3 is a similar detail of the paper feed.
Fig. 4 shows a section detached from the transmitting tape.
Fig. 12 shows the alphabet adapted to be produced by the type elements of Figs. 5 and 6.

Referring to Fig. 1, line wires 1 and 2 are employed, leading from the transmitting station T to the receiving station M. In operation, I automatically record the messages in legible characters at the receiving station through the agency of a number of polarized printing magnets, worked by positive and negative impulses sent over the line wires 1 and 2 separately or simultaneously. The mechanical arrangement for controlling the transmission of these impulses is indicated in Figs. 2, 3, and 4. A paper tape P is taken from a reel P' and passing over guide rolls $p$—$p'$ is led over a platen $t^{20}$ and under a set of springs or contact brushes $t'$, etc., (shown in plan in Fig. 1), thence under another guide or friction roll $p^2$ and to a toothed feed wheel and companion, $p^4$, $p^3$. The teeth $p^{40}$ of the feed-wheel turn within an annular recess $p^{30}$ of the companion, and engage with a central series of perforations $p^5$ of the paper tape, to prevent slipping. This is best shown in Fig. 4. The brushes $t'$, etc., are permitted to make contact at predetermined times and in predetermined order with the platen $t^{20}$ through perforations punched in the tape in any suitable manner. As the method of preparing tape in this way is well understood in the art it is unnecessary for me to describe it. All messages are punched in the tape as a preliminary to the transmitting operation.

The circuits of the transmitter are best shown in Fig. 1. Here B—B'—B²—B³ are the main transmitting batteries, arranged in pairs with poles reversed to line, and connected to the conductors 1 and 2 by the branch wires 3—4—5—6. On the other side battery B is connected to brushes $t'$ and $t^6$ by wires 3—30 and 3—31 respectively; battery B' is connected to brushes $t^2$ and $t^5$ by wires 4—40 and 4—41; battery B² is connected to brush $t^3$ and platen section $t^{30}$ by the wires 5—50 and 5—51 respectively; and battery B³ is connected to the brush $t^4$ and the platen section $t^{40}$ by the wires 6—60 and 6—61 respectively. The platen section $t^{20}$ is grounded by the wire 18.

By this arrangement it is possible to send current impulses of either polarity over either or both line wires and ground, or over the metallic circuit, as follows: if brush $t'$ is permitted to touch the platen $t^{20}$ positive current goes to line from battery B; if brush $t^2$ touches, negative current from battery B' goes to line (this being wire 2 in both cases); if brush $t^3$ touches, positive current from battery $B^2$ goes to line wire 1; if brush $t^4$ touches, negative current from battery $B^3$ goes to line wire 1; if brush $t^5$ touches platen section $t^{30}$ current flows in the metallic circuit 1—2 with positive pole of combined batteries $B' B^2$ to wire 1; if brush $t^6$ touches platen section $t^{40}$ current will flow in the metallic circuit from the combined batteries $B B^3$ in a reverse direction, i. e. with positive to wire 2. Thus all combinations can be made, and any effect or group of effects produced by the arrangement of holes in the tape to permit corresponding arrangement of the brush contacts.

At the receiving station M I employ the polarized electromagnets A—A'—$A^2$—$A^3$—$A^4$— and $A^5$, each magnet when operatively affected producing a certain mark constituting an element of a character, on a recording surface, and one or more of the marks being imprinted for each letter or figure of a message. The mechanical features of the relays will be pointed out presently. Their connections are shown in Fig. 1. A bridge 7—10 across the line wires 1—2 has two parallel branches 8 and 9, containing the coils of the receiving magnets A and A' respectively. A ground connection from wire 1 by way of wires 14 and 17 contains parallel branches 15 and 16 with the coils of receiving magnets $A^4$ and $A^5$; while a similar ground connection from wire 2 by way of wires 11 and 17 contains parallel branches 12 and 13, with the coils of receiving magnets $A^2$ and $A^3$. The magnets A—$A^2$—$A^4$ are all so polarized, or their coils so wound that current of one sign—say positive—will operate them; while magnets A'—$A^3$ and $A^5$ are oppositely polarized or wound. Thus current of one direction in the metallic circuit will operate one magnet A or A' but not the other; while the reverse current will oppositely affect the pair. Similarly any of the other magnets may be made to operate or not, one unit of each pair being available at the same time, by sending current of proper direction over the appropriate circuit.

Figures 5, 6, 7, 8:
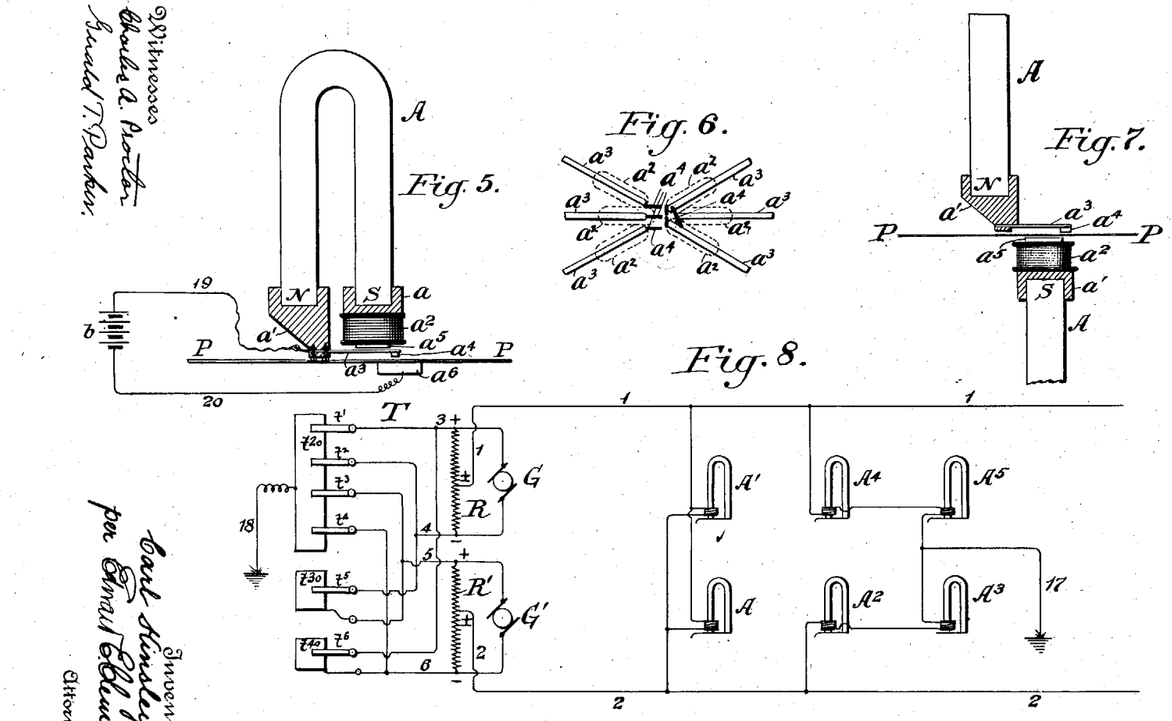
Fig. 5 is a side view partly in section.
Fig. 6 is a bottom view showing the recording mechanism.
Fig. 7 is a similar view to Fig. 5, showing a modification of the recording magnet structure.
Fig. 8 is a diagram of a system employing certain modified arrangements of transmitter and receiver.

Turning now to Figs. 5, 6, and 7, I will describe the structural features of my receiver. In Fig. 5 the form of magnet ordinarily employed in my work is shown. A horseshoe permanent magnet A is provided with soft iron pole pieces $a$ and $a'$, the former carrying a coil $a^2$ and having a projecting pole face $a^5$, while the latter carries a spring member $a^3$ of magnetic material, such for instance as a steel watch-spring, this spring being rigidly attached to the pole $a'$, and extending over in front of the pole face $a^5$ by which it is normally attached to complete the magnetic circuit. In attaching the watch-spring to the pole piece $a'$ I take care that the natural bent is away from the pole face $a^5$, so that when attracted thereby the spring will be distorted from its natural shape and will be under tension. Fig. 6 shows a bottom view of the complete set of receiving magnets, of which only one unit is shown in Fig. 5. The springs are arranged with their outer ends separated radially from a common point, and their inner ends "nested" so that the character that needs all the elements or several of them may be struck at one blow if desired. At the end of each spring a type face or printing tip or attachment $a^4$ is secured. This may be of the same material as the spring, but sometimes I find it necessary to use a different metal, which may be aluminum, platinum, or what not, according to the solution used on the recording surface, as will presently appear. In Fig. 6 these tips or attachments are clearly seen, forming three horizontal lines on the left, and two short vertical and an inclined line on the right, all in black and heavy lines in the drawing, to be clear, although in practice they are light and thin. The overlying coils $a^2$ $a^2$ $a^2$ $a^2$ $a^2$ $a^2$ are shown in dotted lines so as to avoid confusion. The spring $a^3$ is prevented from sticking to the pole-face $a^5$ by means of an interposed magnetic insulator, which may be a copper pin slightly projecting from the pole face, or an electrolytic deposit of copper, or the like. This is made very thin so that it will not lengthen the magnetic circuit appreciably. The spring is also preferably made adjustable on the pole-piece $a'$, so that its tension may be regulated. The simplest way of doing this is shown in Fig. 5, where the end of the spring rests on a curved face and is held thereon at any desired angle by a flat binder and a pair of adjusting screws. The recording surface upon which the pens $a^3$ make their imprints, is preferably, although not necessarily, a paper tape fed over a platen in the same manner as the transmitting tape shown in Fig. 2, the feed wheel having no teeth, however. I do not limit myself to this form of recording surface, as I may use a cylindrical surface fed along longitudinally as it revolves under the pens, so as to produce a spiral record. I find the paper tape the most generally satisfactory, however. The tape (which may obviously be of any suitable material) is indicated in Fig. 5 directly below the printing magnet, passing over a platen $a^6$ of conducting material. This tape is chemically sensitized with any one of the several solutions commonly employed for that purpose. Such a solution is ferrocyanid of potassium, mixed with ammonium nitrate to insure moisture of the tape. With this solution the printing tip or attachment $a^4$ should be of iron, the spring and tip being connected by wire 19 with the positive pole of a printing battery $b$, and the platen $a^6$ by a wire 20 with the negative pole. Several other solutions can be used, the material of the tip being necessarily varied with the solution, as well understood by those who have used my apparatus.

The operation of the printing magnets can now be understood. When there is no current in the line the springs $a^3$ are all held attracted and under tension by the permanent magnets. When a suitable impulse is transmitted through one of the coils $a^2$ that coil will neutralize or weaken the strength of the poles $a$, and the resilience of the spring $a^3$ will instantly snap it away from the magnet into contact with the tape, and upon such contact there will be an instantaneous flow of current from the battery $b$ through the circuit 19—20 and through the pen, the tape, and the platen. The effect of the momentary impulse ceasing, the spring $a^3$ is again attracted, leaving its imprint chemically produced on the tape. Obviously, if two or more of the magnets have been affected by suitable impulses their springs, which are all connected to the wire 19, would all print at once. Thus, by sending properly coördinated impulses of selected polarity a Roman letter or Arabic numeral can be produced. Thus, the imprint of the three horizontal lines with the two short verticals produces the letter E. The tape P during operation of the apparatus is constantly fed along under the pens, and the speed of operation of the latter is so high that even if a group is worked in succession instead of simultaneously, the imprint will be quite legible. The speed of the tape bears such a relation to the speed of the pens in operation, that the same pen or the same group, or different pens in the group, may strike in succession, the distance between successive strokes being determined of course by the rate of travel of the tape. At any predetermined line frequency, this travel of the tape can be determined so as to produce very accurate imprints. The springs $a^3$ are very small and light, and the highest speed desired can be attained by decreasing their length and mass. Being normally under tension they are ready to respond instantly to any weakening in the magnetic force that holds them, and by adjusting them until their power of retraction is just overbalanced by the magnetic force, a very narrow working margin of current can be relied upon to act with certainty, this being of great importance where the instruments are to be worked over long lines. If required, I can make the natural period of these pens practically identical with the frequency of their intended movements or of the transmitted impulses, but this is not necessary. In fact, the pens can always be made to operate at a higher frequency than that to which the transmitted impulses are limited by line conditions. In other words, I approach the theoretical limit of no moving masses in the receiver so closely that the controlling factor is no longer the receiver but the line.

In Fig. 7 a modification of the printing magnet is shown, in which the pen and one pole of the magnet are above the tape $p$, and the other pole with the coil $a^2$ are below the tape. In this case the apparatus works by attraction, the spring being adjusted barely to resist the attractive force of the pole-face $a^5$, so that a slight strengthening thereof will snap it down on the tape. I am here able to work on a narrow margin, also.

In Fig. 8 I show the same transmitting apparatus as in Fig. 1, but with generators in the shape of dynamo machines instead of batteries. The generator G has its poles connected through wires 3 and 4 to the pens $t'$ and $t^2$, while generator G' is connected to the pens $t^3$ $t^4$, with side connections to the other pens and platen sections as in Fig. 1. Across the terminals of the generator G is bridged a non-inductive resistance R, to the middle point of which line wire 1 is connected. This resistance can be made of any magnitude desired, to regulate the voltage on the line. Whatever brushes are in circuit, it will be found upon tracing out the connections that one half of this resistance will always be in circuit with the generator. Thus, if brush $t^2$ touch platen $t^{20}$, and all the others remain insulated, the circuit will be from ground by wire 18 to the platen, by brush $t^2$ and wire 4 to the generator G, to the upper end of the resistance R, down to its middle point, and so to line. The circuits of the other brushes may be similarly traced. Resistance R' bridges the generator terminal G' and has its middle point connected to line wire 2. The functions are the same as in the case of resistance R. The use of these resistances, and their character, enables sparking at the transmitting brushes to be practically eliminated.

At the receiving station in Fig. 8 I have shown the magnet coils of A A' connected in parallel, while the other coils are all connected in series. I have found this advisable, in order to lessen the liability of plus and minus impulses over the metallic circuit being shunted through the grounded magnets. By the present arrangement a considerable difference in resistance is produced, and by introducing suitable resistances in the various transmitter circuits different strengths of current can be sent to line as well as current of opposite signs. In this way too an additional selective principle being available, more than the six magnets shown can be employed. Thus, in Fig. 10 a system is shown employing eight magnets at the receiving station, permitting the use of eight instead of six elements for printing. Moreover, since the selective use of strength as well as polarity is depended upon, it is not necessary to divide the impulses between two or three circuits, and consequently one wire only is shown. In this figure the platen $t^{20}$ is common to all the transmitting brushes, and is grounded by the wire 18. The generator G has its terminals bridged by the resistance R—R', from the middle point of which the line wire is led off, at $g$. The springs $t'$, $t^2$, $t^3$, $t^4$, $t^5$, $t^6$, $t^7$, and $t^8$ are connected to the points $r'$, $r^2$, $r^3$, $r^4$, $r^5$, $r^6$, $r^7$, and $r^8$, respectively, on the coil R—R'. If now the spring $t'$ be permitted to touch the platen $t^{20}$, a current of strength —4 will be sent to line by the following circuit: ground, wire 18, platen $t^{20}$, spring $t'$, wire 3, generator G, wire 4, resistance R', point $g$ and to line. If spring $t^2$ be allowed to touch the platen a current of strength —3 will go to line, the circuit being from ground to platen, to spring $t^2$, to point $r^2$, to point $r'$, to generator, and through resistance R' to line. The succeeding springs, when touching, send decreasing portions of positive current to line in their order, until the point $g$ is reached, when the springs $t^5$, $t^6$, $t^7$ and $t^8$ send increasing strengths of negative current to line, the circuit of spring $t^6$, for example being as follows: ground to platen, to spring $t^6$, to point $r^6$, to point $r^8$, to generator, to point $r'$, to point $g$, and to line. By touching the proper spring to the platen, therefore, any one of four current strengths, of either direction, can be sent to line, and any of the receiving magnets operated. It will be observed that for each increase in current strength not only will the particular magnet responding to that strength respond, but those below it which are of the proper polarity. This makes it possible to group the characters and letters so that several magnets can be worked and several elements printed to form a complete letter by a single impulse. This increases the speed of transmission five-fold. Where the characters are such that the single wire gives an insufficient number of combinations, two wires may be employed as in the other figures. I consider this an important part of my invention.

Figure 10:
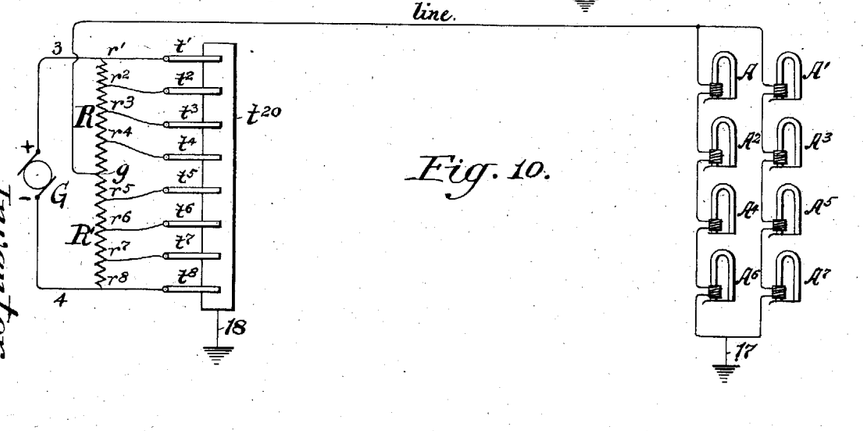
Figure 11:
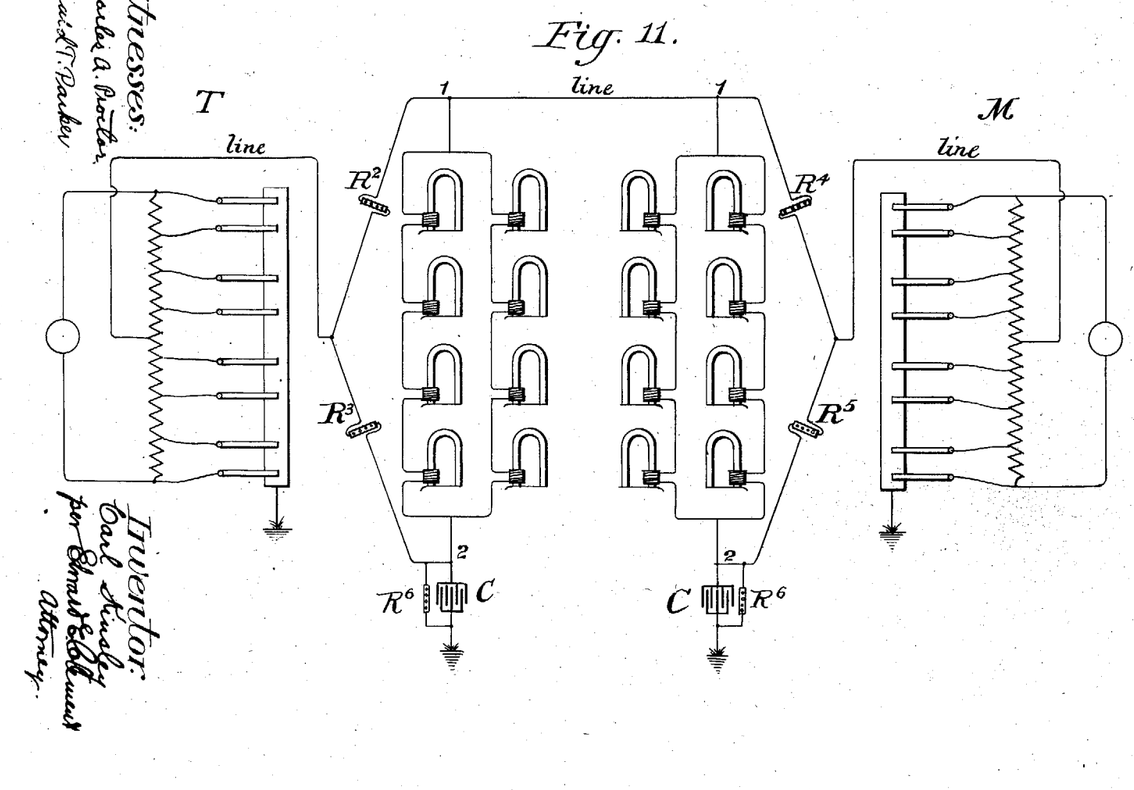
Fig. 11 is a diagram of my telegraph system duplexed by the bridge method.

Fig. 11 shows a series arrangement of the receiving magnets similar to that in Fig. 10, but duplexed by the bridge method. This is intended to show the flexibility of the system. It readily lends itself to any of the ordinary methods of duplexing or even of quadruplexing, which it is unnecessary to describe here. In Fig. 11, the transmitting station is equipped with the strength and polarity transmitter shown in Fig. 10, and the same series arrangement of receiving magnets. At each terminal station the receiving magnets are included between points 1 and 2, connected through resistances $R^2$, $R^3$, to the transmitter; and to line on one side, 1, and ground through a resistance $R^6$ and condenser C on the other, 2. The points 1 and 2 are of equal potential for outgoing or home electromotive forces and currents, but the receiving magnets of course respond to the incoming impulses the same as in Fig. 10. Two line wires may be used and each duplexed in the same way.

Figure 9:
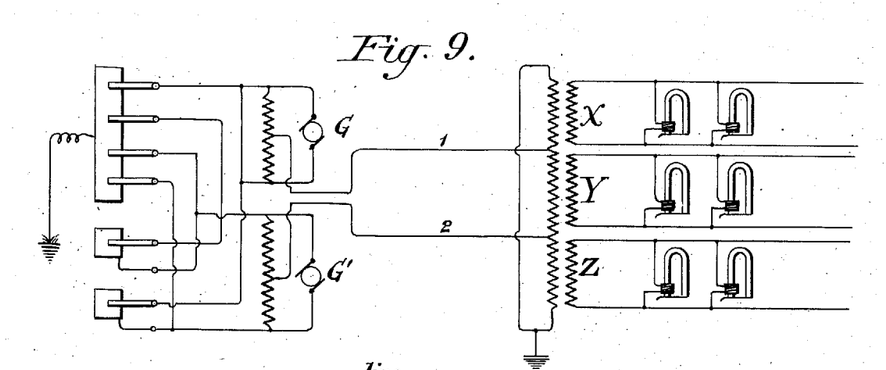
Figs. 9 and 10 are diagrams showing further modifications.

Fig. 9 shows my system equipped with transformers for the receiving station, and I have found that the impulses I use in transmission will produce excellent results through such media. Inasmuch as the impulses are momentary, the secondary discharges are sufficient for the purpose of detaching the recording springs from the magnet faces, and the latter immediately resume their normal condition, with less lag, perhaps, than when directly in the line circuit. As shown, the transmitting station is fitted with the form of transmitter described in connection with Fig. 2 and Fig. 3, while the receivers are all in parallel branches of separate local circuits connected to the secondaries of the transformers X, Y, Z, the primaries of which are across the line, and from the two sides of line to ground. The strength and polarity combination can also be effected with transformers without difficulty, although I have not deemed it necessary to illustrate it.

Having thus described my devices and system, a detailed statement of operation does not seem necessary. I will merely add, therefore, that I believe it to be broadly new with me to use a combination of chemical and printing receivers in telegraphy, utilizing the virtues of both, and thereby eliminating their faults. I do not wish to be understood as in any wise limiting myself therefore to the specific construction or arrangement I have described, as many other arrangements can be made without departing from the spirit of my invention.

For the sake of clearness and convenience, certain terms which I shall use in my claims are defined as follows: By a character-printing type-electrode I desire to indicate one that prints a portion or all of a legible letter, numeral or sign, the same being completely significant in itself and not composed merely of arbitrary marks arranged according to a code. Such printing is to be distinguished from merely code marks which in themselves have no significance whatever, and are not directly legible even collectively without transcription. By "type printer" I shall indicate a printing means which actually prints legible alphabetical or numerical characters or their associated marks having a direct significance to all who are acquainted with the language to which they belong.

It is to be noted that my invention is not limited to the use of types bearing only fragments of a letter, but contemplates the use of any type face for printing as ordinarily understood; that is, printing readable characters, not code signs. This is a distinction universally recognized in the telegraph art, but I explain it for the sake of clearness.

What I claim and desire to secure by Letters Patent is:

1. In a telegraphic system, a sending station, a receiving station and a line connecting them, a source of current at the sending station together with means to connect the source to line to supply current of either direction and of different strengths, a recording surface at the receiving station and a number of movable pens coöperating therewith, each adapted to produce on the surface a mark constituting one element of a letter or character, magnets controlling the said pens, each magnet arranged to actuate its pen under the influence of current of a particular direction or a particular strength, or both, and connections from the magnets to line such that they may be caused to receive the currents determined at the sending station.

2. In a telegraph system, a sending station, a receiving station, and a line connecting them, a source of current at the sending station with a transmitter to send current to line in various strengths and of either direction in accordance with a determinate code, a recording surface at the receiving station, a set of recording pens adapted to coöperate therewith, each pen printing an element of a character, a corresponding set of magnets, each adapted to actuate its pen under the influence of current of given strength and polarity, and connections from said magnets to line and to each other such that the magnets controlling the elements of certain characters will simultaneously respond.

3. In telegraphic receiving apparatus, a recording surface, a recording pen therefor, said pen being composed of resilient material and held rigidly at one or more points, a magnet normally acting to distort the pen and prevent it from printing, and means whereby the magnetism may be varied to release the pen and permit it to print.

4. In telegraphic receiving apparatus, a recording surface, a pen of resilient material coöperating therewith, said pen being rigidly held at one or more points, but free at others, a permanent magnet including the pen in its field, and means whereby the magnet may be caused to distort the pen at will to alter its position relative to the recording surface for the purpose of printing.

5. In a telegraphic system, a sending and a receiving station and a line circuit connecting them, means at the sending station for transmitting current impulses at high frequency over the line, and a receiving apparatus connected to the line comprising an electromagnet, a resilient character printing type electrode directly controlled by said magnet, said electrode having a size, shape and mass whereby it will have a natural period of vibration approximating that of the line impulses, a chemically sensitized recording surface adapted to receive a character imprint from said electrode, and a circuit connection for said electrode to a suitable source of current whereby impact upon the sensitized surface will produce an instantaneous impression by means of electro-chemical action, substantially as described.

6. In a telegraphic system, a sending station and a line, means at the sending station for transmitting impulses over the line at high frequencies, a receiving apparatus connected to the line, comprising a chemical surface, means for moving the same, a plurality of movable members each having a type face adapted to strike the chemical surface when actuated, circuit connections for said movable members, and electromagnetic controlling means adapted to act directly on the movable members and to respond directly to current in the line, the size, shape and mass of each movable member being such that it will have a very high natural period, all the movable members having proper circuit connections whereby they may print electrochemically on the surface with very short periods of impact, substantially as described.

7. In a telegraphic system, a line, a source of current therefor, and transmitting apparatus arranged to produce current impulses of high frequencies in the line, a type printer having movable character printing members proportioned and adjusted to have a high natural period, with a chemical printing surface, and electromagnets selectively controlled by the currents in the line, and acting to directly control the action of the type printer on the chemical surface, substantially as described.

8. In a telegraphic system, a receiver comprising a sensitized surface, a resilient character-printing type electrode of high period and small mass adapted to print on said surface, means for producing relative spacing movement between the electrode and surface, a printing magnet arranged to normally hold the electrode within its range of control, and means whereby the action of the magnet on said electrode may be modified at will, substantially as described.

9. In a telegraphic system, a line, transmitting and receiving apparatus connected to the line, the latter comprising a sensitized surface, an electrode of high natural period of vibration, said electrode normally under tension adapted to move in one direction by reason of its own resilience and to be moved in the other direction against the resistance of the same, an electro-magnet arranged to act on said electrode, and means to control the magnet, substantially as described.

10. In high speed telegraphic receiving apparatus, a recording surface, a recording pen formed directly of magnetic material and polarized, a magnet arranged to have the pen within its field, and means to modify the said field to control the record, substantially as described.

11. In high speed telegraphic receiving apparatus, a recording surface, an electromagnet, means to control the magnet, a pen of magnetic material adapted to print on the surface and to be acted on by the magnet to control such printing, and a tip or attachment secured to the pen and formed of suitable material to record on the aforesaid surface, substantially as described.

12. In high speed telegraphic receiving apparatus, an electromagnet, means to control the magnet, a recording surface, a pen formed of resilient magnetic material arranged in proximity to the magnet to be controlled thereby, and a tip or attachment for the pen arranged in proximity to the recording surface and composed of suitable material to coöperate therewith in making a record, substantially as described.

13. In a telegraphic system, a sending station and a line, means at the sending station to determine current impulses in the line, a receiving station, a transformer connected to line at the receiving station, a printing magnet in a local circuit of said transformer, a character printing type-electrode under control of said magnet, a recording surface coöperating therewith, said electrode being composed of resilient magnetic material, substantially as described.

14. In a telegraphic system, a receiver comprising a moving surface, a printing magnet, and a printing lever composed of magnetic material and of shape and dimensions such that it will have a very high natural period, will make a quick stroke and have a short impact, together with suitable transmitting means, substantially as described.

15. In a telegraph receiver, a recording surface, and a coöperating printing member of dimensions such as to have a high natural period of oscillation, so as to produce a quick stroke and a short impact, and to respond to high speed impulses, together with controlling means acting directly on such printing member, substantially as described.

16. A high speed telegraphic receiver, comprising a printing surface and a movable printing member of such dimensions as to have a high natural period of oscillation and attenuated as to mass, whereby the certainty of responsiveness of the receiver through a wide range of transmitted frequencies is attained, as well as a quick stroke and a short impact, substantially as described.

17. A printing telegraph receiver comprising a printing surface, a controlling electromagnet, and a movable character-printing member of resilient material and of such dimensions as to have a high natural period of oscillation, but attenuated as to mass, whereby the certainty of responsiveness of the receiver through a widely varying range of transmitted frequencies is attained, substantially as described.

18. A telegraphic receiver for high frequency systems, comprising a plurality of selective printing magnets, a movable character printing member for each magnet composed of resilient material, of shape and dimensions such as to have a high natural period but attenuated as to mass, each member having a type face, and a printing surface in coöperative relation with all the printing members, together with means for producing an instantaneous chemical imprint when any one of the members touches the surface, substantially as described.

19. A printing member for high speed printing telegraph receivers carrying a type face, composed of magnetic resilient material, and formed to have a high natural period of vibration, together with an actuating electromagnet responsive to line currents and adapted to act directly upon the printing member to attract and release the same, substantially as described.

20. A character printing type member for high speed printing telegraph receivers composed of magnetic resilient material, carrying a type face, and with a body formed to have a high natural period of vibration but attenuated as to mass, and a printing magnet acting directly on said member, substantially as described.

21. A character printing type member, for printing telegraph receivers, composed of resilient magnetic material carrying a type face and with its body formed to have a high natural period of vibration, a permanent magnet polarizing the same, and means to vary the magnetic strength thereof.

22. A printing member for telegraph receivers composed of resilient magnetic material, means to distort said member from its natural position, and means acting directly thereon to control its movements of distortion and release, substantially as described.

23. A telegraph receiver comprising a printing member and a record surface, said printing member being composed of resilient material and being under tension when out of contact with the surface, together with means to adjust the length of stroke so that impact will occur approximately at the moment when the printing member becomes free from distortion, whereby the rebound from the surface may assist in shortening the duration of impact, substantially as described.

24. In a telegraph receiver, a record surface and a resilient printing member, means to maintain said printing member under tension away from the surface by a force but slightly superior to its own, and means controlled electrically from without to neutralize the margin of superiority, whereby the printing member may act, substantially as described.

25. In a telegraphic system, a transmitting station provided with means to transmit impulses at high speed, a line, and a receiving station, a record surface, a printing member coöperating therewith formed of magnetic material and normally held under tension, away from the surface, by magnetic means exercising an attraction but slightly stronger than the reactive tendency, together with means connected to the line and responding to changes in the line currents or impulses to modify the magnetic controlling force in accordance therewith, substantially as described.

26. In a telegraph receiver, a permanent magnet, a pen of resilient material mounted thereon so as to be part of the magnetic circuit and to be normally distorted against its own resilience, a coil so arranged as to affect the magnetic field when current passes, connections from said coil to line, and a record surface arranged to coöperate with the pen, substantially as described.

27. In a telegraph receiver, a bi-polar permanent magnet, a pen of resilient magnetic material mounted on one pole of the magnet and extending into proximity with the other, a coil on the magnet connected to line terminals, and a record surface having relative movement with and past the pen, substantially as described.

28. In a telegraph receiver, a platen, a sensitized tape, and feeding means to move the tape over the platen at a high speed, a bipolar permanent magnet mounted over the platen, a pen of resilient magnetic material mounted on one magnet pole and extending into proximity to the other and to the tape, a printing tip on the pen, a coil on the magnet, and line connections therefor, substantially as described.

29. In a high speed printing telegraph, a type lever attenuated as to mass and resilient as to material, a character printing type head thereon, said lever and head formed to have a high natural period but responsive to more than one frequency of transmitted impulses, electromagnetic means responding directly to said transmitted line impulses and acting directly upon said type lever, and a record surface coöperating with said type lever, all substantially as described.

30. A printing telegraph system, comprising transmitting means adapted to send current impulses over the line according to a predetermined code and at high speeds, and a receiving device comprising a plurality of magnetic printing members, a plurality of selectively operated printing magnets, directly responsive to the line currents, and a record surface having relative movement with respect to the printing members, substantially as described.

31. In a telegraphic system, a sending and a receiving station and a line circuit connecting them, means at the sending station for transmitting current impulses at high frequency over the line, and a receiving apparatus connected to the line comprising an electromagnet, a resilient character printing type electrode directly controlled by said magnet, said electrode having a size, shape and mass whereby it will have a natural period of vibration approximating that of the line impulses, and a traveling recording surface driven at a rate of speed which will permit successive strokes of one or more electrodes to be made within the space of a single letter or character, said surface adapted to receive a character imprint from each electrode at each stroke, substantially as described.

32. In a telegraphic system, a sending station and a line, means at the sending station for transmitting impulses over the line at high frequencies, a receiving apparatus connected to the line, comprising a chemical surface, means for moving the same, a plurality of movable members each having a type face adapted to strike the chemical surface when actuated, circuit connections for said movable members, and electromagnetic controlling means adapted to act directly on the movable members and respond directly to current in the line, the size, shape and mass of each movable member being such that it will have a very high natural period, all the movable members having proper circuit connections whereby they may print electrochemically on the surface with very short periods of impact, the rate of travel of the recording surface and the time constant of each movable member being so determined that each type, acting in response to successive line impulses, may produce successive impacts and impressions on the surface within the dimension of a single letter or character, substantially as described.

33. A printing telegraph receiver comprising a printing surface, a controlling electromagnet, and a movable character-printing member of resilient material and of such dimensions as to have a high natural period of oscillation, but attenuated as to mass, together with means to produce relative motion between the printing surface and the character-printing member at a rate so related to the period of stroke of said member, that successive impacts or printing impressions may be produced during the continuous relative movement through a space not to exceed the dimension of a letter or character, substantially as described.

34. A printing telegraph system, comprising transmitting means adapted to send current impulses over the line according to a predetermined code and at high speeds, and a receiving device comprising a plurality of magnetic printing members, a plurality of selectively operated printing magnets, directly responsive to the line currents, and a record surface having relative movement with respect to the printing members, its relative travel with respect to the speed of stroke of the printing members being such that successive current impulses may produce successive strokes of the same printing member more than once in the same character or letter, substantially as described.

35. In a printing telegraph system, a plurality of fractional printing elements not exceeding six in number, means to actuate each element in response to a line impulse or impulses, a traveling body carrying a record surface, and means to drive the same at a speed less than the speed of repetition of strokes by the printing members, and means to produce repeated strokes of the same member at will, whereby one or more of the printing elements may be caused to produce different portions of the same letter or character, substantially as described.

36. In a system of printing telegraphy, a plurality of printing pens, carrying type faces composed of single elemental lines; a recording surface for said pens; and means whereby said pens may be operated to imprint their type faces upon said recording surface to form abutting imprints of different elemental lines by one impulse of one polarity over one line conductor.

37. In a system of printing telegraphy, a plurality of printing pens, carrying type faces composed of single elemental lines and operable by means of current impulses of variant polarity and intensity over line conductors; and means whereby imprints of said pens may be made to abut each other at an angle by amplifying the energy of the impulse by which one of said imprints was made.

38. In a printing telegraph system a first set of pens, magnets adapted to operate said pens and adjusted to operate said pens in response to currents of an intensity exceeding a predetermined limit; other pens constituting a second set of pens; magnets for operating pens of said second set and adjusted to operate the pens only in response to currents exceeding a second predetermined limit, the predetermined limit for said second set of pens being higher than the corresponding limit for said first set of pens.

39. In a printing telegraph system, pens of first and second classes, pens of the first class responsive to all transmitting currents which are proper in direction and pens of the second class responsive only to transmitting currents which are of the proper direction and which also exceed a predetermined critical volume.

In testimony whereof I affix my signature, in presence of two witnesses.

CARL KINSLEY.

Witnesses:
CHARLES A. PROCTOR,
GERALD T. PARKER.